(No Model.)

O. C. LITTLE.
SPLIT PULLEY.

No. 452,866. Patented May 26, 1891.

Witnesses:
Jno. P. Shells
C. W. Johnson

Inventor:
Orton C. Little,
By his Atty. G. H. Abell.

UNITED STATES PATENT OFFICE.

ORTON C. LITTLE, OF MENASHA, WISCONSIN.

SPLIT PULLEY.

SPECIFICATION forming part of Letters Patent No. 452,866, dated May 26, 1891.

Application filed September 29, 1890. Serial No. 366,433. (No model.)

*To all whom it may concern:*

Be it known that I, ORTON C. LITTLE, a citizen of the United States, residing at Menasha, in the county of Winnebago and State of Wisconsin, have invented a new and useful Improvement in Split Pulleys, of which the following is a specification.

My invention relates to the construction of the pulley-hub and the manner of securing the arms of the pulley therein, and also to the form of the tie-plate which is used in connecting the rim-section of one half of the pulley-rim to the other half, the object being to provide a hub in which the arms can be easily secured and in which they can be made tight should they from shrinkage or other reason become loosened, and also to provide a tie-plate for a split pulley in which the bolt-holes, both for connecting the tie-plates to each other and to the pulley-rim section, are formed in the process of casting said tie-plate, and thereby avoiding the labor necessary in drilling one or both of said holes. I attain these objects by the means illustrated in the accompanying drawings, in which—

Figure 1:
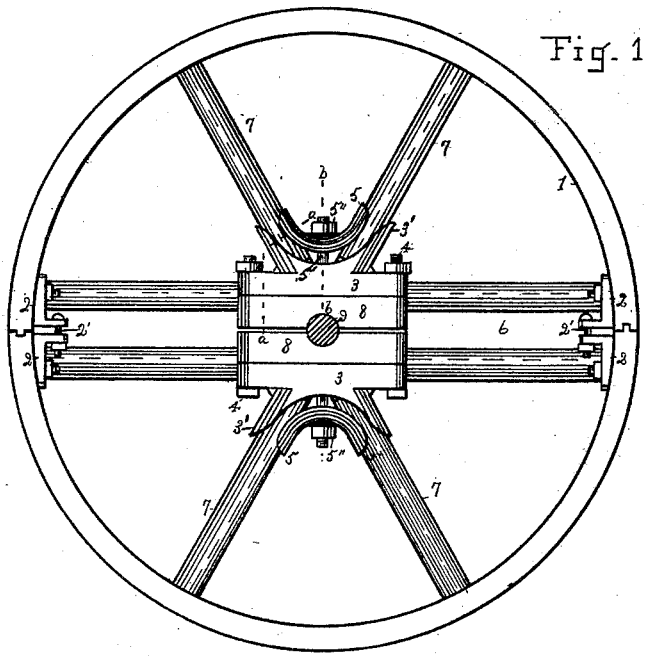
Figure 2:
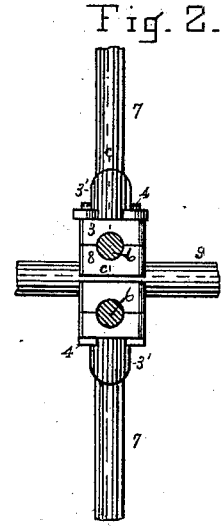
Figure 3:
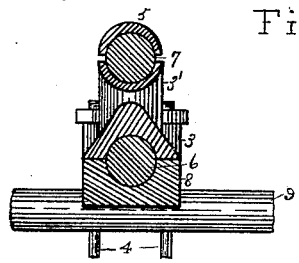
Figure 4:
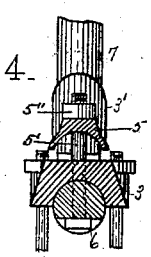
Figure 5:
Figure 6:
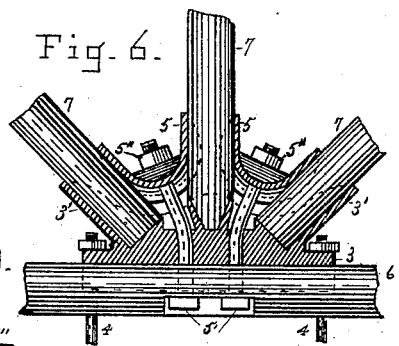
Figure 7:
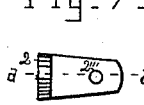
Figure 8:
Figure 9:
Figure 10:

Figure 1 is an elevation showing a pulley embodying my invention; Fig. 2, an end view of the hub, the bushing-section, a shaft within it, and a portion of the pulley-arms; Fig. 3, a sectional view, upon an enlarged scale, of the hub-section and its bushing-section upon the line $a\,a$ of Fig. 1; Fig. 4, a sectional view upon a similar scale upon the line $b\,b$ of Fig. 1, showing one of the parallel arms and the manner of securing it and of clamping the other arms to the hub-section; Fig. 5, a longitudinal section of a hub-section upon the line $c\,c$ of Fig. 2; Fig. 6, a like longitudinal section of a hub-section, showing a modification of the hub adapted to receive an additional pulley-arm; Fig. 7, a plan of the tie-plate for connecting the two half-sections of the pulley-rim to each other; Fig. 8, a plan of the bottom side of the longer leg of the tie-plate; Fig. 9, a plan of the outer side of the shorter leg thereof, and Fig. 10 a vertical section longitudinally thereof upon the line $d\,d$ of Fig. 7.

Similar figures of reference indicate like parts in the several views.

The pulley consists of two semicircular rim-sections 1, having tie-plates 2 and bolts 2' for securing together the meeting ends of the rims, the hub-sections 3, and bolts 4 for securing the hub-sections together and the pulley upon its shaft, (each hub-section having a clamping-piece 5,) two parallel arms 6, extending across the pulley, and two or more arms 7, projecting outward from each of said hub-sections at about an equal distance from each other and from the parallel arms 6, and also having two sections of a bushing 8 placed between the two hub-sections, and between which the shaft 9, on which the pulley is used, is clamped.

The several parts of the pulley (the hub-sections 3, the clamping-pieces 5, tie-plates 2, and the bolts excepted) may be made of wood or any other material adapted for it, the hub-sections, clamping-pieces, and tie-plates being preferably made of metal. Each of said hub-sections is adapted to receive one of the parallel arms 6 and also two or more of the arms 7, which are inserted into a socket 3'. The clamping-piece 5 is placed between two of the arms 7 and a bolt 5' inserted through the arm 6 and clamping-piece 5 and secured with the nut 5''. The screwing up of the nut 5'' tightens the arm 6 to the hub-section and at the same time compresses each of two arms 7 of the hub-section between the clamping-piece and the socket-piece 3' or between two clamping-pieces when the number of arms so requires, and as the sockets converge toward the center of the pulley said arms are drawn in that direction and abut against the bottom of their socket. The bushing-sections are concaved upon one side to fit around the arm 6, and upon their opposite side at right angles with said concavity are concaved to fit the shaft upon which the pulley is to be used. These bushing-sections are to be made with said last-named concavity to fit shafts of different diameter and are interchangeable, so that by changing said bushing-sections one pulley may be made to fit different sizes of shafts. The bolts 4 pass through both the hub-sections 3 and bushing-sections 8 and serve to not only connect those parts, but to secure the pulley upon the shaft.

The pulley-arms 6, extending from one side to the other across the pulley, connect with the rim-sections near their ends and form a direct connection between the ends of each semicircular rim-section, while the tie-plates, being attached to said section near their ends, present with their bolts means for drawing the meeting ends of the rim-sections together. These tie-plates I make of metal by casting, and they are made of the form as shown in the several views thereof, the surface of the shorter leg of each, which opposes the like surface of another tie-plate when said plates are arranged upon two pulley-rim sections, being concaved from its outer edge to the bolt-hole 2″, having but a thin edge of metal around it, and the surface of the longer leg, which comes in contact with the pulley-rim, while it is curved at its side edges to conform to the circle of the pulley, is concaved from its surrounding edges toward the bolt-hole 2‴ in a similar manner, except upon the side of said hole against which the bolt which connects it to the pulley-rim will bear in drawing two rim-sections together where the metal is left flush with the side edges of said leg across its surface, thereby giving strength where required, while leaving its form such that said holes can be made perfect and of the form necessary for their purpose when being cast and providing a tie-plate which is finished ready for use when cast and cleaned.

I do not claim a split pulley as new, neither do I claim one having parallel arms, nor do I claim, broadly, a tie-plate for split pulleys; but What I do claim, and desire to secure by Letters Patent, is—

1. In a split pulley, the combination of a hub-section having within its concave surface a main pulley-arm extending across the pulley, said pulley-arm forming with the pulley-rim the chord of an arc of less than half a circle, shorter pulley-arms within said arc, each arranged in a socket upon said hub-section at approximately equal angles with said main arm and with each other, a clamping-piece between said short arms, and a bolt passing at approximately a right angle through the main arm, through the hub-section, between the short arms, and through the clamping-piece at nearly equal angles with said last-named arms, and thereby securing said arms to the hub-section, substantially as described.

2. In a split pulley, the combination of two hub-sections, each having within its concave surface a main pulley-arm extending across the pulley parallel one with the other and forming with the pulley-rim chords of arcs of less than half a circle, shorter pulley-arms arranged within each arc, each in a socket upon said hub-section at approximately equal angles with said main arm and with each other, a clamping-piece between each of said shorter arms, and a bolt passing at approximately a right angle through the main arm, through the hub-section, between the shorter arms, and through the clamping-piece at nearly equal angles with said last-named arms, and thereby securing the arms of each hub-section thereto, a semicircular rim-section secured upon the arms of each hub-section, a bushing-piece for each hub-section, and bolts for connecting the pulley-rim sections and for clamping the hub-sections and bushings together and upon a shaft, substantially as described.

3. A tie-plate for use in connecting the two semicircular sections of a split-pulley rim to each other, consisting of an angular piece having a hole in each leg of said angle for receiving a bolt, the outer surface of each of said legs being concaved from the outer edges thereof toward said holes and leaving but a thin edge of metal around them, except upon the side of the hole against which the bolt which connects it to the pulley-rim will bear in drawing the two rim-sections together, where it is left flush with the surrounding edges across said outer surface, substantially as shown and described.

4. In a split pulley, the combination of two hub-sections, each having a pulley-arm extending across the pulley parallel one with the other and forming with the pulley-rim chords of arcs of less than half a circle, and also having pulley-arms arranged within said arc, each in a socket upon said hub-sections at approximately equal angles with the first-mentioned arm and with each other, each hub-section being provided with a clamping-piece and a bolt therefor, each of said bolts passing through one of said parallel arms, a hub-section, and a clamping-piece, and thereby securing the arms of each hub-section thereto, a semicircular rim-section secured upon the arms of each hub-section, a tie-plate near each end of said rim-sections, said tie-plates consisting of an angular piece having a hole in each leg of the angle and a bolt therefor, the outer surface of each of said legs being concaved from the outer edges thereof toward said holes and leaving but a thin edge of metal around them, except upon the side of the hole against which the bolt connecting it with the pulley-rim will bear in drawing said rim-sections together, where it is left flush with surrounding edges across said outer surface, a bushing-piece for each hub-section, and bolts for clamping the hub-sections and bushing together and upon a shaft, substantially as described.

ORTON C. LITTLE.

Witnesses:
JNO. P. SHIELLS,
C. W. JOHNSON.